Sept. 2, 1958 J. SANSEVERINATI 2,849,976
SEWING METHOD AND APPARATUS
Filed June 19, 1957 2 Sheets-Sheet 1

INVENTOR.
JOSEPH SANSEVERINATI
BY
Johnston and Yauter
ATTORNEYS.

INVENTOR.
JOSEPH SANSEVERINATI
BY
Robertson and Jontie
ATTORNEYS.

United States Patent Office 2,849,976
Patented Sept. 2, 1958

2,849,976

SEWING METHOD AND APPARATUS

Joseph Sanseverinati, Philadelphia, Pa.

Application June 19, 1957, Serial No. 666,560

2 Claims. (Cl. 112—162)

This invention relates generally to a novel method and apparatus for producing overcast or overedge stitching.

Heretofore, as is well known to those versed in the art, it was necessary to employ two different types of sewing machines to produce blind stitching and overcast stitching. That is, conventional blind stitch machines have been incapable of use in making overcast or overedge stitches, so that it was necessary to employ a separate overcast stitch machine when this operation was desired, or to perform overcast stitching by hand. The cost of a separate overcast stitch machine is especially burdensome in many small shops where its use is not often required.

Accordingly, it is a general object of the present invention to provide a unique method and apparatus for use in conjunction with conventional blind stitch machines, wherein such machines serve to produce overcast stitching.

It is another object of the present invention to provide an extremely simple and efficient method of employing conventional blind stitch machines to produce overcast stitching, which method is rapid in operation and can be quickly and easily learned by an operator with only a minimum of instruction.

It is a further object of the present invention to provide an attachment for a conventional blind stitch machine to convert the latter to an overcast machine, which attachment is extremely simple and durable in construction, requiring no moving parts, is adapted to be quickly and easily attached to and removed from the blind stitch machine, and which is capable of being manufactured and sold at a reasonable price.

Other objects of the present invention will become apparent upon reading the following specification and referring to the accompanying drawings, which form a material part of this disclosure.

The invention accordingly consists in the features of construction and combinations and arrangements of elements and method steps, which will be exemplified in the following description, and of which the scope will be indicated by the appended claims.

Figure 1:
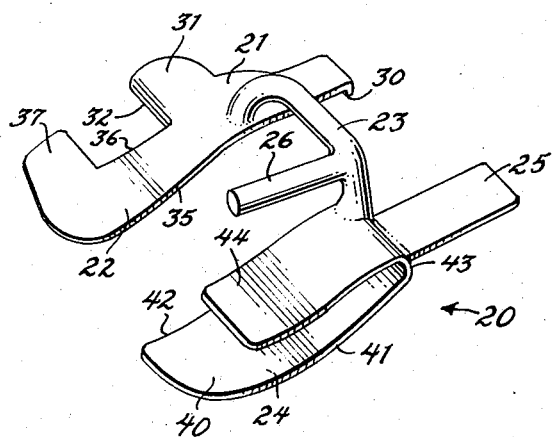
Figure 1 is a top perspective view illustrating the attachment of the present invention apart from a blind stitch machine.

Referring now more particularly to the drawings, and specifically to Figure 1 thereof, the device illustrated therein is generally designated 20 and includes a plate-like portion or mount 21 from which extend a laterally declining guide member 22. A bridge or yoke 23 has one end fixedly secured to the mount 21 and extends forward therefrom. Fixedly secured to the forward end of the bridge 23, arranged in forwardly spaced relation with the respect to the guide member 22, is a front guide member 24. A handle 25 projects laterally from the front guide member 24, being spaced forwardly of the mount 21; and, a stop member or brace 26 projects laterally from the bridge 23 adjacent to but spaced rearward and above the front guide member 24.

More specifically, the mount 21 is defined by a generally laterally extending plate-like element having its undersurface configured to conformably seat on the upper side of a blind stitch machine presser foot, as will appear hereinafter in greater detail. Depending from the laterally outer edge of the mount 21 is a generally forwardly and rearwardly extending flange 30, while a rearward plate-like extension 31 is provided on the laterally inward portion of the mount 21 and is formed on its leftward edge, as seen in Figure 1, with a depending, generally forwardly and rearwardly extending flange 32.

The rear guide member 22 is preferably formed of an integral plate-like extension from the left-hand side of the mount 21. As seen in Figure 1, and declines therefrom generally leftward and downward, preferably having its forward edge 35 spaced slightly below its rearward edge 36 so as to incline rearwardly. On the laterally outer or left-hand end of the rear guide member 22 is provided a rearward extension plate or foot 37 spaced laterally outward from the inner flange 32 of the mount 21.

The forward guide member 24 is disposed in generally laterally extending relation, spaced forwardly of the rear guide member 22, and includes a lower plate-like member or wall 40 which exends laterally from the forward end of the bridge 23, declining leftward, and also preferably has its forward edge 41 spaced slightly below its rearward edge 42 so as to incline rearward. On the laterally inward or right-hand end of the bottom wall 40, and extending upward therefrom, is a side wall 43; and, a top wall 44 extends from the side wall laterally leftward in generally parallel spaced relation over the bottom wall 40. As appears in the drawings, the bottom wall 40, side wall 43 and top wall 44 of the front guide member 24 may be integrally formed and assume the configuration of a strip bent into a generally U-shape, with the bottom and top walls defining the legs and the side wall defining the bight. The handle bar or plate 25 extends laterally rightward from the bight portion 43.

Referring now to Figures 2–4, and 6, the attachment 20 of the instant invention is illustrated therein in operative association with conventional components of a blind stitch machine. While the particular embodiment of the instant attachment has been primarily developed and employed for use in conjunction with blind stitch machines of the type disclosed in U. S. Patents Nos. 2,514,837, and 2,108,100, and 1,926,644, it is understood that the device and method of the present invention are not limited to these specific machines, but applicable to all machines of similar operating principles.

The conventional components of the illustrated portion of a blind stitch machine include an open presser foot 50, a laterally oscillatory needle 51 carried in a needle bar 52, a cloth positioning rib 53, and a looper 54 mounted by conventional means for cooperating movement with the needle.

The presser foot 50 may be a generally horizontally disposed plate of laterally arcuate contour so as to be concave upwardly, and provided in its lowermost region with a generally forwardly and rearwardly extending through opening 55 bounded on opposite sides by generally forwardly and rearwardly extending side edges 56 and 57. The needle bar 52 is mounted on a forwardly and rearwardly extending shaft 58, see Figure 3, and carries the arcuate needle 51 at the left-hand end of the latter to oscillate the needle over the presser foot opening 55. That is, the needle 51 is disposed to extend generally laterally of the presser foot 50 and is alternately projected rightward over and across the presser foot opening 55, and retracted leftward away from the presser foot opening, all in the conventional manner. The presser foot 50 is conventionally formed in its upper surface with a laterally extending groove 59, within which the needle 51 oscillates.

A conventional wear plate 60 may be fixed on the upper surface of the presser foot 50, as by a threaded fastener 61, to prevent needle wear on the presser foot, and a guide block or abutment 63 may be fixed on the forward region of the presser foot 50, as by a fastener 62, to aid in locating the attachment 20, as will appear presently.

Also conventional in blind stitch machines is the provision of a presser foot shoe mounted on the presser foot forward of the path of needle movement, and having its free end portion swingable downward toward the presser foot opening 55 and upward away from the latter. Suitable resilient means, such as a spring 66 serves to bias the presser foot shoe 65 downward toward the presser foot opening.

Figure 6:
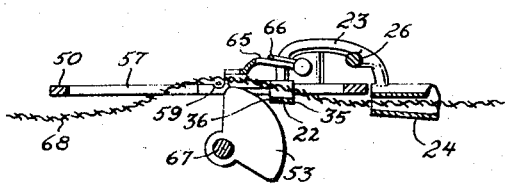
Figure 6 is a vertical sectional view taken substantially along the line 6—6 of Figure 2.

As best seen in Figure 6, the rib 53 is mounted on a lateral shaft 67 for oscillation into and out of the presser foot opening 55, and will cooperate, but in a novel manner as will appear presently, with the presser foot shoe 65 to insure proper feeding movement of the fabric or cloth 68 through the sewing machine. Hence, with the exception of element 20, described in detail in connection with Figure 1, all of the above mentioned parts are conventional, and references made to the above mentioned patents for a more detailed discussion thereof.

Figure 4:
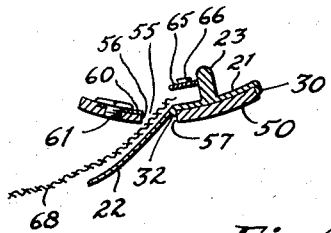
Figure 4 is a vertical sectional view taken substantially along the line 4—4 of Figure 2.
Figure 3:
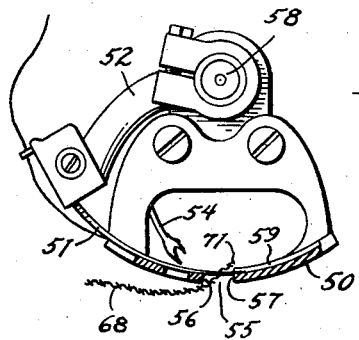
Figure 3 is a vertical sectional view taken substantially along the line 3—3 of Figure 2.
Figure 5:
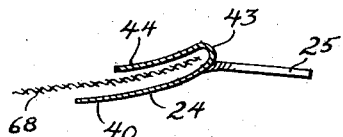
Figure 5 is a vertical sectional view taken substantially along the line 5—5 of Figure 2.

For convenience in terminology, the right-hand side of the presser foot 50, to the right of the opening 55 as seen in the drawings, will be called the projection side as the needle 51 is projected toward that side, and the left-hand side of the presser foot, on the left of the opening, will be called the retraction side as the needle is retracted toward that side. In the assembly of element 20 with the conventional components of the sewing machine, it will be seen that the mounting plate 21 is seated on the upper surface of the presser foot on the projection side thereof, just forward of the path of the needle 51, and firmly retained in position by engagement of its flange 30 over the outer edge of the presser foot and its flange 32 over the bounding edge 57 of the presser foot opening. This is best seen in Figure 4. The rear guide member 22 extends from the mount generally downward through the opening 55 and laterally to the retraction side of the presser foot, being spaced below the latter and from the edge 56 of the presser foot opening.

With the mount 21 thus positioned, the bridge 23 extends forward, and the brace 26 has its free end in firm locating abutment with the block 61. This aids to positively locate the attachment 20 without the inconvenience of threaded or other type fasteners.

It will also be observed that the forward guide member 24 is located just forward of the presser foot 50, directly in front of the presser foot opening 55, having its bottom wall 40 extending generally laterally and declining from the projection side toward the retraction side of the presser foot. In Figure 6 it will be noted that the space within the front guide member 24 is located for the most part at a level below that of the presser foot 50.

Figure 9:
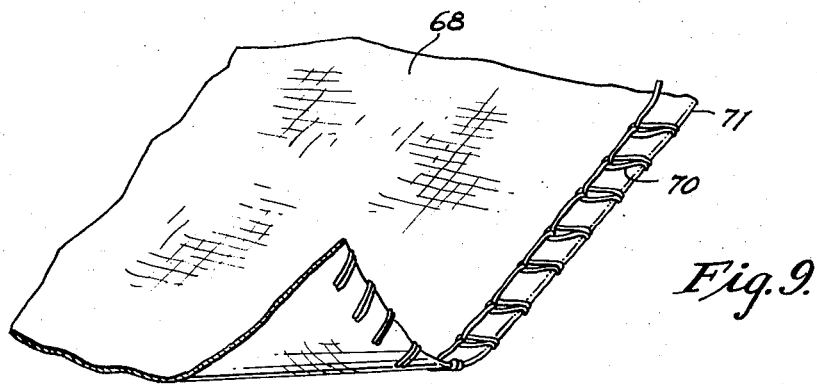
Figure 9 is a fragmentary perspective view illustrating overcast stitching of the present invention.
Figure 2:
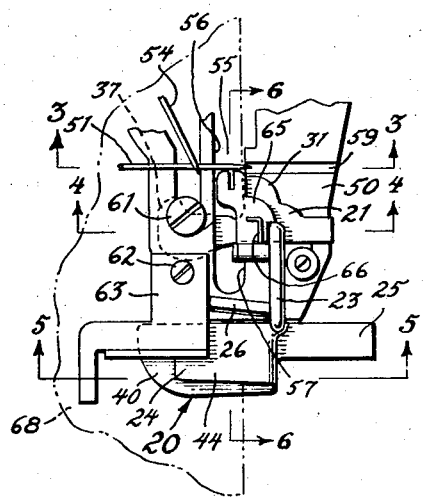
Figure 2 is a top plan view showing the attachment of the present invention in its operative association with the adjacent component of the blind stitch machine, and illustrating in dot-and-dash outline a fabric being operated upon.

In operation, with the attachment 20 positioned on the machine as illustrated and described hereinbefore, it is only necessary to feed the fabric 68 through the machine, as will be described hereinafter, to effect the overcast or overedge stitching 70 of Figure 9. More specifically, the fabric 68 is fed rearward first through the guide member 24, the side wall 43 thereof being engageable with the fabric edge portion 71 to be stitched for limiting lateral displacement thereof, which guide member elevates the subject marginal edge portion of the fabric for passage over the rear guide member 22. The fabric then passes over the rear guide member 22 having its edge 71 thereby directed upward through the presser foot opening 55, see Figure 4, and passing in this condition through the path lateral movement of the needle 51. Thus, the needle penetrates the fabric 68, passing inward through one side thereof and out through the other fabric side, and cooperates with the looper 54 to define the overcast stitching 70 illustrated in Figure 9. The rib 53 and presser foot shoe 65 cooperate during this procedure to engage, respectively, with the lower and upper surfaces of the fabric to aid in properly positioning the latter with its edge portion extending upward through the presser foot opening. As the rear guide member 22 may be considered as extending from its retraction end upward through the presser foot opening 55, being spaced from the retraction side edge 56 of the opening, it is understood that the fabric edge portion is positively directed upward through the presser foot opening.

Figure 7:
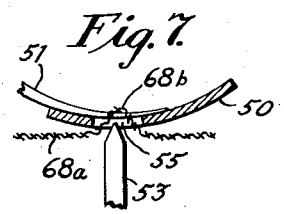
Figure 7 is a fragmentary vertical sectional view similar to Figure 3, but illustrating the conventional method of operation.
Figure 8:
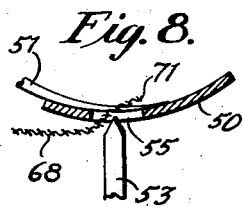
Figure 8 is a vertical sectional view similar to Figure 7 and illustrating the instant method.

While the method of the instant invention is thought to have been substantially disclosed in the foregoing description, its comparison with the prior art may be clearly seen in Figures 7 and 8. In the former figure, fabric 68a has an intermediate portion 68b deflected upward through the presser foot opening 55 by the rib 53 to form a bight through which the needle 51 is projected and retracted. By this method the needle may or may not pass through the underside of the fabric, and in either case the needle projects out from the fabric on the same side of the fabric into which it entered. It is by this method that the conventional blind stitch is formed.

In contrast, see Figure 8, in the method of the present invention, the cloth or fabric 68 is passed generally horizontally through the blind stitch machine and has its free edge portion 71 longitudinally of the direction of passage through the machine diverted upward. The needle 51 is then extended or projected through the upwardly diverted fabric edge portion so as to enter through one side of the fabric and leave through the other fabric side. It is this upward direction of the fabric edge and penetration of the projecting needle end into one face of the fabric and out of the other fabric face which, in combination with the conventional cooperation of the looper and thread, results in the overcast stitch.

In view of the foregoing, it is seen that the present invention provides a novel method and apparatus for performing overcast stitching, which fully accomplish their intended objects, and are well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. In a blind stitch type sewing machine having a presser foot formed with a through opening, a needle mounted for lateral extension and retraction over said opening, a rib disposed below and extending upward into said opening for supporting fabric being stitched, and a shoe mounted on said presser foot and resiliently biased downward towards said opening for engagement with fabric on said rib, the improvement comprising: a mount adapted to seat on the pressure foot forward of the path of movement of said needle on one side of said opening opposite to said needle when the latter is in its retracted position, and a guide member extending from said mount generally downward through said opening and laterally toward the other side of said opening spaced from the bounding edge of said opening of said other side thereof, whereby fabric fed rearward over said guide member will pass between said rib and shoe and have one edge portion directed upward through said opening toward said one side thereof into the path of needle movement.

2. The construction set forth in claim 1, in combination with an additional guide member arranged forward of said first named guide member directly in front of said presser foot opening and fixedly secured to said mount, said additional guide member including a generally laterally extending bottom wall adapted to support said fabric being fed toward said first named guide member, and a side wall upstanding from said bottom wall on said one side of said presser foot opening adapted to engage with the edge portion of a fabric to properly position the latter for passage over said first named guide member and through said pressure foot opening.

References Cited in the file of this patent

UNITED STATES PATENTS

| | | |
|---|---|---|
| 1,069,010 | Hemleb | July 29, 1913 |
| 1,552,405 | Adams | Sept. 8, 1925 |
| 1,825,597 | Maier et al. | Sept. 29, 1931 |
| 2,690,722 | McGreery | Oct. 5, 1954 |
| 2,736,283 | Adams | Feb. 28, 1956 |